United States Patent
Glaza et al.

(10) Patent No.: US 9,268,848 B2
(45) Date of Patent: Feb. 23, 2016

(54) SEMANTIC NAVIGATION THROUGH OBJECT COLLECTIONS

(75) Inventors: Ted G. Glaza, Seattle, WA (US); Hamid Mahmood, Seattle, WA (US); Terry A. Adams, North Bend, WA (US); Vincent Paul Sibal, Seattle, WA (US); Vijay Devatha, Redmond, WA (US); Michael John Hillberg, Beaux Arts, WA (US); Matthew Jake Hohn, Snoqualmie, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1147 days.

(21) Appl. No.: 13/287,627

(22) Filed: Nov. 2, 2011

(65) Prior Publication Data

US 2013/0111413 A1     May 2, 2013

(51) Int. Cl.
| | |
|---|---|
| *G06F 3/0481* | (2013.01) |
| *G06F 17/30* | (2006.01) |
| *G06F 3/01* | (2006.01) |
| *G06F 3/0482* | (2013.01) |

(52) U.S. Cl.
CPC .......... *G06F 17/30861* (2013.01); *G06F 3/017* (2013.01); *G06F 3/0482* (2013.01); *G06F 3/04812* (2013.01); *G09G 2340/145* (2013.01)

(58) Field of Classification Search
CPC . G06F 3/04812; G06F 3/0481; G06F 3/0482; G06F 3/017; G09G 2340/145; H04L 41/22
USPC ................. 715/854–855, 709–712, 765–767, 715/863–864
See application file for complete search history.

(56) References Cited

U.S. PATENT DOCUMENTS

| | | |
|---|---|---|
| 5,121,477 A | 6/1992 | Koopmans |
| 5,495,567 A | 2/1996 | Iizawa |
| 6,230,170 B1 | 5/2001 | Zellweger et al. |
| 6,545,687 B2 | 4/2003 | Scott et al. |
| 6,738,079 B1 | 5/2004 | Kellerman |
| 2003/0046401 A1 | 3/2003 | Abbott et al. |
| 2004/0252120 A1 | 12/2004 | Hunleth et al. |
| 2006/0048045 A1 | 3/2006 | Lehenbauer et al. |

(Continued)

OTHER PUBLICATIONS

Berners-Lee, et al., "Tabulator: Exploring and Analyzing Linked Data on the Semantic Web", In Proceedings of the 3rd International Semantic Web User Interaction Workshop, Nov. 2006, 16 pages.

(Continued)

*Primary Examiner* — Steven Sax
(74) *Attorney, Agent, or Firm* — Timothy Churna; Leonard Smith; Micky Minhas (57) ABSTRACT

Embodiments are directed to semantically navigating a data collection and to providing custom data mappings for a semantic group of data items. In one scenario, a computer system displays various data items of a data collection on a data presentation interface of a software application user interface. The user interface receives a first user input indicating that a semantic interface is to be displayed in the software application user interface, and displays the semantic interface which includes semantic headers that identify groups of data items. The user interface then receives a second user input that selects at least one of the semantic headers to display its corresponding group of data items and navigates the data presentation interface to the group of data items corresponding to the selected semantic header.

10 Claims, 5 Drawing Sheets

(56) References Cited

U.S. PATENT DOCUMENTS

| | | | |
|---|---|---|---|
| 2006/0184540 A1* | 8/2006 | Kung et al. | 707/10 |
| 2007/0013699 A1 | 1/2007 | Nelson et al. | |
| 2007/0027742 A1* | 2/2007 | Emuchay et al. | 705/10 |
| 2007/0192739 A1* | 8/2007 | Hunleth et al. | 715/823 |
| 2007/0214409 A1 | 9/2007 | Miyata | |
| 2007/0214415 A1 | 9/2007 | Williams | |
| 2007/0256024 A1 | 11/2007 | Schell | |
| 2008/0098021 A1 | 4/2008 | Harada | |
| 2008/0294978 A1 | 11/2008 | Klintsov et al. | |
| 2009/0049388 A1 | 2/2009 | Taib et al. | |
| 2009/0204919 A1 | 8/2009 | Dan | |
| 2009/0210816 A1 | 8/2009 | Ingebretsen | |
| 2009/0248421 A1* | 10/2009 | Michaelis et al. | 704/276 |
| 2009/0320004 A1 | 12/2009 | Fertitta | |
| 2009/0327969 A1* | 12/2009 | Estrada | 715/848 |
| 2010/0122175 A1* | 5/2010 | Gupta et al. | 715/735 |
| 2010/0194703 A1* | 8/2010 | Fedor | G06Q 30/02 345/173 |
| 2010/0251129 A1 | 9/2010 | Beringer et al. | |
| 2010/0313125 A1* | 12/2010 | Fleizach | G06F 3/04883 715/702 |
| 2011/0074828 A1* | 3/2011 | Capela | G06F 3/0481 345/661 |
| 2011/0078600 A1 | 3/2011 | Guertler et al. | |
| 2011/0113364 A1 | 5/2011 | Neil et al. | |
| 2011/0141519 A1 | 6/2011 | Hirose | |
| 2011/0191303 A1* | 8/2011 | Kaufman et al. | 707/684 |
| 2011/0258049 A1* | 10/2011 | Ramer et al. | 705/14.66 |
| 2012/0011437 A1* | 1/2012 | James | G06F 1/1643 715/702 |
| 2012/0105367 A1* | 5/2012 | Son | G06F 3/0414 345/174 |
| 2012/0117185 A1* | 5/2012 | Cassidy | G06F 17/30053 709/217 |
| 2012/0297341 A1 | 11/2012 | Glazer et al. | |
| 2013/0016128 A1* | 1/2013 | Bhatt | G06T 11/60 345/661 |
| 2013/0033521 A1* | 2/2013 | Karasin et al. | 345/619 |
| 2013/0067370 A1 | 3/2013 | Branson et al. | |
| 2013/0067390 A1* | 3/2013 | Kwiatkowski et al. | 715/784 |
| 2013/0067398 A1* | 3/2013 | Pittappilly et al. | 715/800 |
| 2013/0067399 A1* | 3/2013 | Elliott et al. | 715/800 |
| 2013/0067420 A1* | 3/2013 | Pittappilly et al. | 715/863 |
| 2013/0080887 A1 | 3/2013 | Hou | |
| 2013/0212499 A1 | 8/2013 | Mentchoukov et al. | |
| 2014/0157142 A1* | 6/2014 | Heinrich | H04L 67/1095 715/744 |

OTHER PUBLICATIONS

U.S. Appl. No. 13/287,665, filed Nov. 2, 2011, Glaza.
Anderson, Chris, "Providing Custom Layout Engines for Windows Forms", Published on : Sep. 2001, Available at: http://msdn.microsoft.com/en-us/library/ms973821.aspx.
"Layout on the Screen", Retrieved on: Aug. 16, 2011, Available at: http://create.msdn.com/en-US/education/quickstarts/Layout_on_the_Screen.
"Layout Overview", Retrieved on: Aug. 16, 2011, Available at: http://msdn.microsoft.com/en-us/library/cc295017.aspx.
"Working with ItemsPanel in WP7", Published on: Mar. 3, 2011, Available at: http://www.windowsphonegeek.com/tips/working-with-itemspanel-in-wp7.
Wiesener, et al., "SemaLink: An Approach for Semantic Browsing through Large Distributed Document Spaces", In Proceedings of the Third Forum on Research and Technology Advances in Digital Libraries, May 13-15, 1996, pp. 86-94.
Vosinakis, et al., "Virtual Worlds as Information Spaces: Supporting Semantic and Social Navigation in a shared 3D Environment", In Proceedings of Third International Conference on Games and Virtual Worlds for Serious Applications, May 4-6, 2011, pp. 220-227.
Nesic, et al., "Search and Navigation in Semantically Integrated Document Collections", In the Fourth International Conference on Advances in Semantic Processing, Oct. 25, 2010, pp. 55-60.
Berners-Lee, et al., "Tabulator: Exploring and Analyzing Linked Data on the Semantic Web", In Proceedings of the 3rd International Semantic Web User Interaction Workshop, 2006, 16 pages.
Office Action dated Mar. 28, 2014 cited in U.S. Appl. No. 13/287,665.
Office Action dated Jul. 31, 2014 cited in U.S. Appl. No. 13/284,665.
Office Action dated Nov. 21, 2013 cited in U.S. Appl. No. 13/287,665.
Office Action dated Jun. 26, 2015 cited in U.S. Appl. No. 13/287,665.

* cited by examiner

SEMANTIC NAVIGATION THROUGH OBJECT COLLECTIONS

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

To facilitate user interaction with the software application, user interfaces are provided. These software user interfaces allow users to interact with the application via mouse, keyboard, pen, touch inputs or other types of inputs. In some cases, the software applications may provide the user access to large lists or collections of data items. For instance, a company's directory application may provide access to thousands or even millions of names. Scrolling through these names using typical swiping gestures or mouse clicks may be taxing on the user.

BRIEF SUMMARY

Embodiments described herein are directed to semantically navigating a data collection and to providing custom data mappings for a semantic group of data items. In one embodiment, a computer system displays various data items of a data collection on a data presentation interface of a software application user interface. The user interface receives a first user input indicating that a semantic interface is to be displayed in the software application user interface, and displays the semantic interface which includes semantic headers that identify groups of data items. The user interface then receives a second user input that selects at least one of the semantic headers to display its corresponding group of data items and navigates the data presentation interface to the group of data items corresponding to the selected semantic header.

In another embodiment, a computer system receives a first user input that maps data items from a data presentation interface to a group of data items in a semantic interface. The computer system then receives a second user input indicating that a semantic interface is to be displayed in the software application user interface, and determines which data items were being displayed when the second user input was received. Next, based on the determination of which data items were being displayed when the second user input was received, the computer system indicates to the software application which group of data items is to be displayed in the semantic interface and displays the indicated group of data items in the semantic interface.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments of the invention may be realized and obtained by means of the instruments and combinations particularly pointed out in the appended claims. Features of the embodiments of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The embodiments of the invention will be described and explained with additional specificity and detail through the use of the accompanying drawings in which.

DETAILED DESCRIPTION

Embodiments described herein are directed to semantically navigating a data collection and to providing custom data mappings for a semantic group of data items. In one embodiment, a computer system displays various data items of a data collection on a data presentation interface of a software application user interface. The user interface receives a first user input indicating that a semantic interface is to be displayed in the software application user interface, and displays the semantic interface which includes semantic headers that identify groups of data items. The user interface then receives a second user input that selects at least one of the semantic headers to display its corresponding group of data items and navigates the data presentation interface to the group of data items corresponding to the selected semantic header.

In another embodiment, a computer system receives a first user input that maps data items from a data presentation interface to a group of data items in a semantic interface. The computer system then receives a second user input indicating that a semantic interface is to be displayed in the software application user interface, and determines which data items were being displayed when the second user input was received. Next, based on the determination of which data items were being displayed when the second user input was received, the computer system indicates to the software application which group of data items is to be displayed in the semantic interface and displays the indicated group of data items in the semantic interface.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmissions media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

Figure 1:
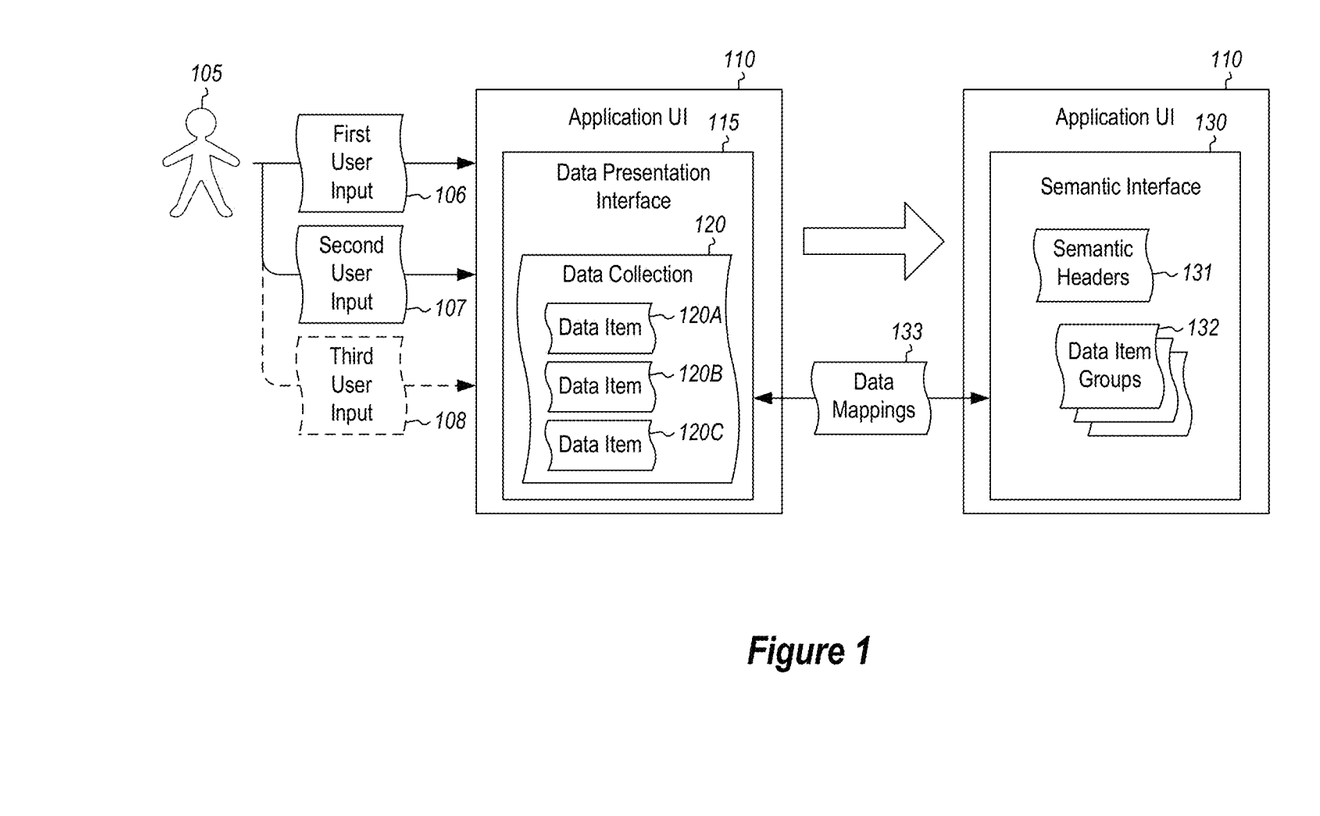
FIG. 1 illustrates a computer architecture in which embodiments of the present invention may operate including semantically navigating a data collection and providing custom data mappings for a semantic group of data items.

FIG. 1 illustrates a computer architecture 100 in which the principles of the present invention may be employed. Computer architecture 100 includes application user interface (UI) 110. The user interface may be for any type of software application or portion of software functionality. The UI allows users (e.g. user 105) to interact with the software application. These interactions may come as the result of different user inputs (e.g. 106, 107 and 108). The user inputs may include any type of user interaction with the UI including touch inputs or gestures, pen inputs or gestures, keyboard or mouse inputs or any other means of interacting with an application's user interface.

The application UI 110 may include different interfaces (or sub-interfaces) including a data presentation interface 115 and a semantic interface 130. In some embodiments, the data presentation interface 115 may be a default interface in which the data items associated with the software application are all displayed as laid out by the application. For example, if the application were a contact management application, and the data items 120A-C were part of a collection 120 of contacts, the contacts would be displayed in alphabetical order, starting with contacts that have a last name that starts with "A". In order to reach contacts that have a last name that starts with "Z", the user would typically have to scroll down with repeated inputs. In embodiments described herein, a user may input a specific gesture (such as a pinch, flick, multi-finger input, specific sequence of keys on a keyboard, mouse gesture or other predefined input) to open a semantic interface 130.

The semantic interface may be displayed in place of the data presentation interface 115, on top of the data presentation interface (in a semi-opaque fashion), in a corner of the data presentation interface, or in another manner selected by the application developer. The semantic interface may display semantic headers 131 that organize the data items of collection 120. The headers may represent groups of data items 132. Thus, in the example above, the semantic headers may be alphabet letters where each letter has an associated group of contacts whose last names start with that letter. Accordingly, instead of displaying all of the available contacts, the semantic display may only display alphabetic letters (individually or as groups (e.g. A-F, G-L, etc.). The user may then scroll through the semantic group headers to get to the desired group of data items.

From an application developer's perspective, UI control may be provided to allow switching between the data presentation interface to the semantic interface. The UI control facilitates switching between content and a semantic view of that content which is made generic by defining how the two different views communicate. The UI control allows substantially any two views or interfaces to communicate. Thus, one control may show the data items (in the data presentation interface) and the other control shows data item groups (in the semantic interface). These concepts will be described in greater detail below with regard to methods 200 and 300 of FIGS. 2 and 3, respectively.

Figure 2:
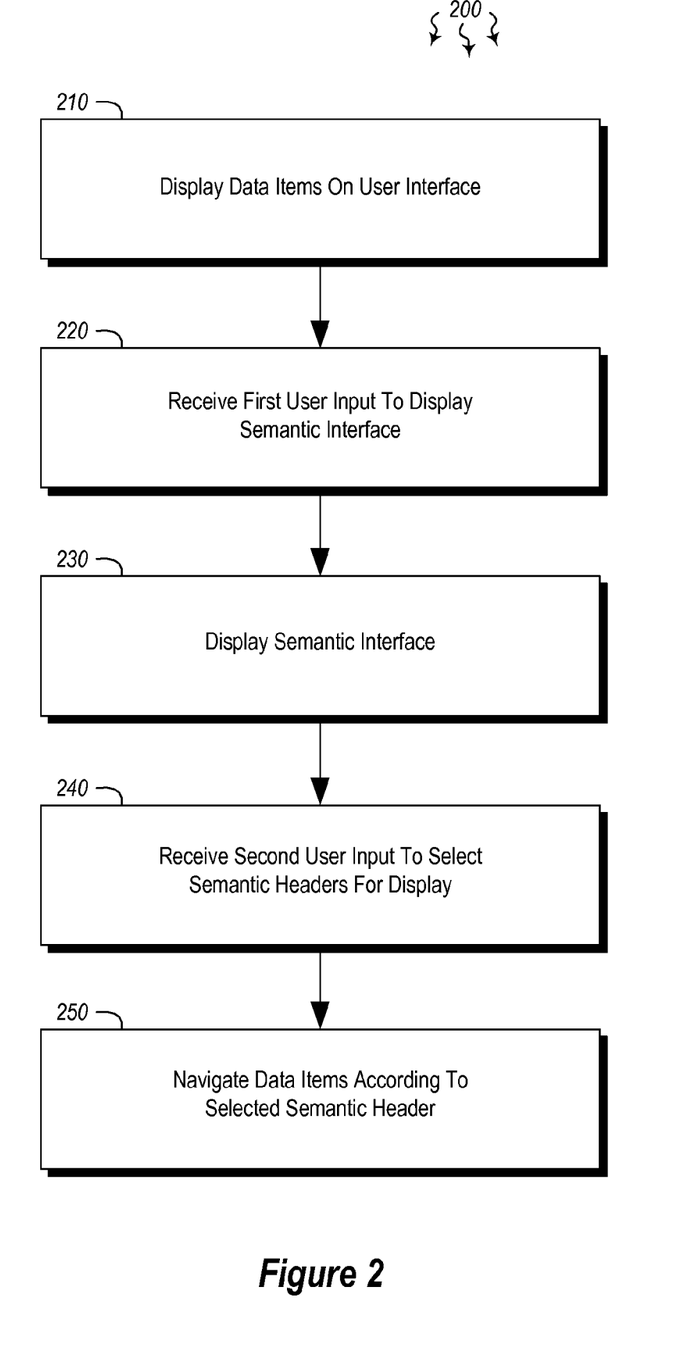
FIG. 2 illustrates a flowchart of an example method for semantically navigating a data collection.
Figure 3:
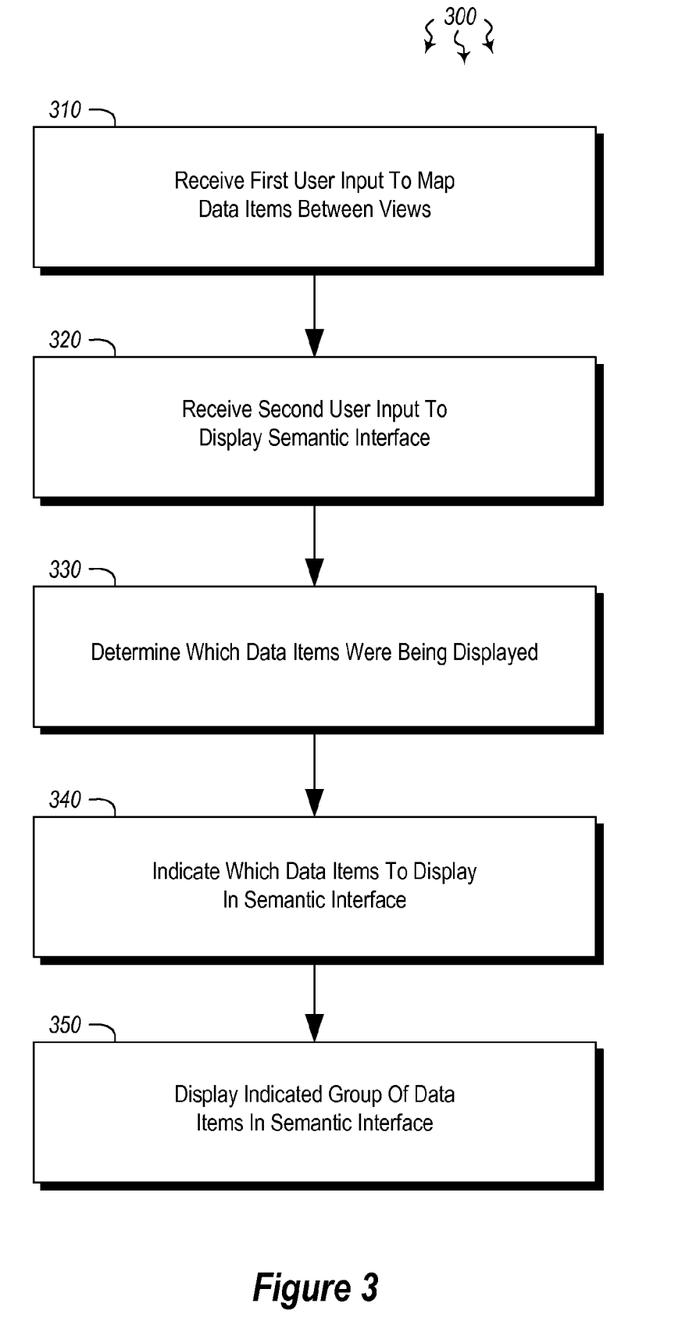
FIG. 3 illustrates a flowchart of an example method for providing custom data mappings for a semantic group of data items.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for semantically navigating a data collection. The method 200 will now be described with frequent reference to the components and data of environment 100.

Method 200 includes an act of displaying one or more data items of a data collection on a data presentation interface of a software application user interface (act 210). For example, application user interface 110 may display data items 120A-C of data collection 120 in data presentation interface 115. The data presentation interface may be configured to show the original or default view for the software application. The application may show more or fewer data items than those shown in FIG. 1. Indeed, substantially any number of data items can be shown in interface 115. The data items may be text, media (including pictures, videos and audio files) or any other type of data. The data items may be stored locally, or may be transferred from a remote data source such as the internet.

Method 200 also includes an act of receiving a first user input indicating that a semantic interface is to be displayed in the software application user interface (act 220). For example, application UI 110 may receive first user input 106 from user 105. The first user input, in this example, indicates that semantic interface 130 is to be displayed in the application UI. The user input that triggers the display of the semantic interface may include any one or more of the following: a touch gesture (or combination of gestures), a keyboard input, a mouse gesture and/or a pen gesture. The pressing of a button or other control may also initiate the semantic interface. Once the semantic interface has been initiated, it is displayed in the application UI (act 230).

The semantic interface displayed in the application UI includes one or more semantic headers 131 identifying groups of data items 132. The semantic headers may define or group the underlying data items of the data presentation interface in a higher-level, semantic fashion. For instance, if the data items are movies in a collection of movies, the semantic headers may include movie titles and genre information, for example. The user may then sort through the headers based on genre or based on the first letter of the movie title. One skilled in the art will appreciate that substantially any type of semantic headers may be used for any different type of underlying data item. The data-item-to-semantic-header mappings 133 may be customized by the application developer and, at least in some cases, may be adjusted, altered or fully customized by the user. As many different headings may be used, certain gestures or other user inputs may allow the user to select different headings and have the semantic interface sort the data items according to the selected semantic heading.

The semantic interface 130 may be displayed in various different manners. For instance, the semantic interface may be displayed in place of the data presentation interface, such that the data presentation interface is no longer visible when the semantic interface is displayed. Alternatively, the semantic interface may be superimposed over the data presentation interface, such that the data presentation interface is still at least somewhat visible underneath the semantic interface. In such cases, the degree of opacity of the semantic interface may be customized by the developer and/or the end user. Still further, the semantic interface may be displayed in a smaller portion of the overall data presentation interface (e.g. in a corner, or in a smaller, centered window). Any of the above-described display options for the semantic view may be combined or customized as desired.

The developer of the software application may provide the semantic headers 131 for each software application. Thus, the developer may fully control how the data displayed in the data presentation interface is presented in the semantic interface. The data items 120A-C of the data collection 120 are grouped according to one or more criteria. For instance, if the application shows a user's contacts with their associated contact information, the semantic headers may group the data items according to the user's building number, position, work group, first or last name, relationship with the company, or any other criteria. The end user 105 may then sort through the semantic headers using various different gestures or inputs.

In some cases, a semantic navigation extension may be added to a software application that previously did not provide any semantic view. The extension allows the application to provide the semantic view, while an application manager or administrator can determine what appears in the semantic interface. Using the extension, the software application that previously had no semantic interface can then display the semantic interface to the user for interaction therewith. In this case, the semantic navigation extension provides a semantic interface that is in addition to the software application's default user interface.

Figure 5:
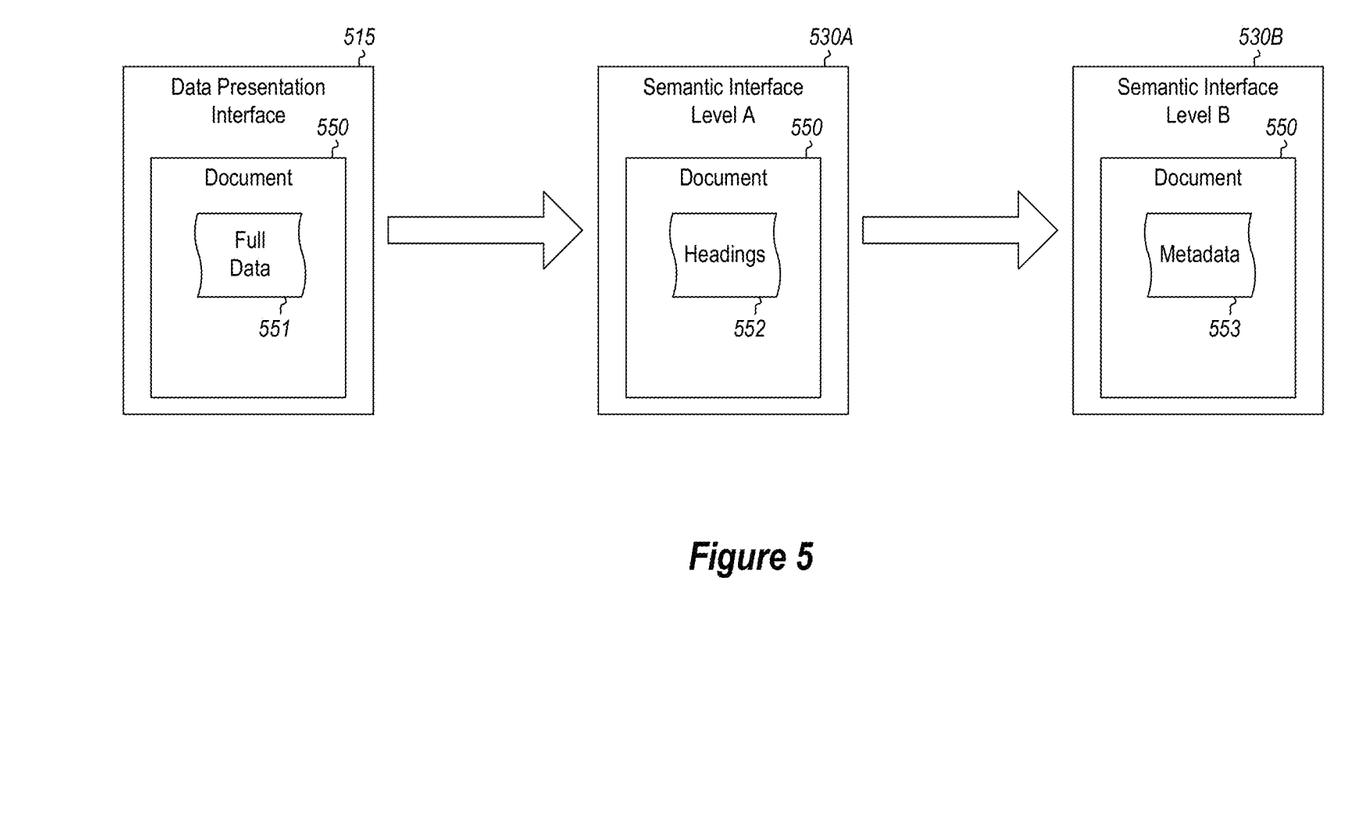
FIG. 5 illustrates an embodiment in which multiple different semantic interfaces are provided.

In some embodiments, multiple different semantic interfaces may be provided, where each semantic interface provides a different level of data item detail. For instance, as shown in FIG. 5, a data presentation interface 515 may show a document 550 with all of its text, pictures and other data 551. A first-level semantic interface 530A (at level A) may show the document 550, but only with different data headings 552, as opposed to the full text shown in the data presentation view. A second-level interface 530B (at level B) may show the document 550, but only with metadata 553 about the document (including title, date of creation, date of last edit, etc.), as opposed to showing full text or data headings. It will be understood that while two levels of semantic views are shown in FIG. 5, substantially any number of semantic views may be used, and may show a correspondingly variable amount of detail at each level. The amount of detail shown at each level (as well as the number of levels and how each level is displayed (in any of the above-described manners)) may be fully customized per application or per user. A control may be provided that allows the user to zoom between the different semantic interfaces.

Figure 4:
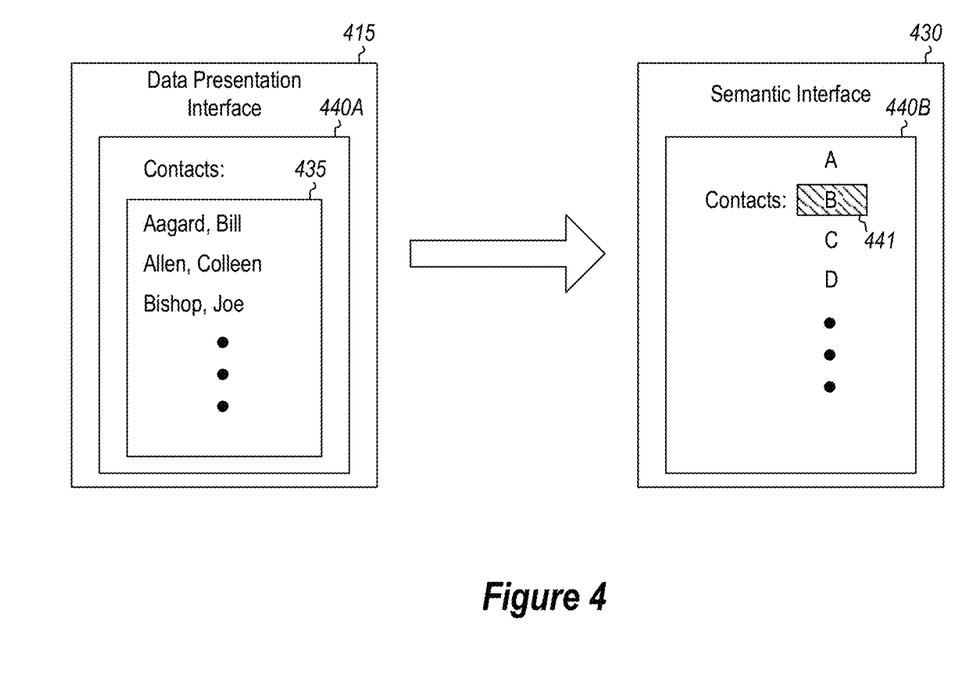
FIG. 4 illustrates an embodiment in which a semantic interface is displayed in place of a data presentation interface.

Returning to FIG. 2, method 200 includes an act of receiving a second user input that selects at least one of the semantic headers to display its corresponding group of data items (act 240). For example, application UI 110 may receive second user input 107 from user 105 which selects one of the displayed semantic headers 131 to display its corresponding group of data items 132. For instance, as shown in FIG. 4, the data presentation interface 415 may show a collection of contacts 440A which lists each contact alphabetically 435. The contact application's semantic view 430 may show alphabetical headings for each contact listed by first or last name. Thus, in the collection 440B, the contacts with a last name that starts with "B" may be represented by the "B" semantic header 441. Once the "B" header is selected (e.g. by the second user input 107), those contacts with a last name starting with "B" will be displayed in the data presentation interface 415. Thus, the data presentation interface is navigated to the group of data items corresponding to the selected semantic header (act 250). In some scenarios, a third user input 108 may dynamically select a new (different) criteria on which the data items are to be sorted in the semantic interface. The semantic interface may then be updated to sort the data items according to the newly-selected criteria.

In some cases, these data items in the data collection may be organized hierarchically. That is, the data items may be organized in a root and tree manner, in a parent and child manner, or in any other organizational manner. In such case, each data is related to the other data items in the collection. As the user provides inputs to the user interface, the semantic interface may allow navigation through the data items according to the hierarchy. Thus, the semantic headers may begin with root data items, and may provide access to tree branch data items as the user navigates through the headers. In some cases, the semantic headers 131 may comprise the root data item(s) and the data items displayed in the data presentation interface (after the user selects a semantic header in the semantic interface) may comprise the tree branch and/or leaf items.

FIG. 3 illustrates a flowchart of a method 300 for providing custom data mappings for a semantic group of data items. The method 300 will now be described with frequent reference to the components and data of environment 100.

Method 300 includes an act of receiving a first user input that maps one or more data items from a data presentation interface to a group of data items in a semantic interface (act 310). For example, application UI 110 may receive first user input 106 from user 105 which maps data items from the data presentation interface 115 to data item groups 132 in semantic interface 130. The mappings 133 may be defined by the software application developer as they are coding the application. The developer may specify different levels of data that are to be displayed at each semantic interface level (see FIG. 5 and related discussion above).

Method 300 further includes an act of receiving a second user input indicating that a semantic interface is to be displayed in the software application user interface (act 320). For example, application UI 110 may receive second user input 107 indicating that semantic interface 130 is to be displayed within the application UI. The semantic interface may be displayed in a variety of different manners, including over the top of the data presentation interface (replacing it completely or in a semi-opaque fashion) or in any other manner desired by the application developer.

Method 300 then includes an act of determining which data items were being displayed when the second user input was received (act 330). For example, a computer system that executes the application and displays the application UI may determine which data items were being displayed when the second user input was received. Based on this determination, the computer system may indicate to the software application which group of data items is to be displayed in the semantic interface (act 340). Thus, for example, if the software application is a contact management application and contacts with last names starting with "A" are currently displayed when the second user input is received (that initiates the semantic interface), the semantic interface may be initialized with semantic headers for contacts whose names start with "A-D". Accordingly, the semantic interface takes into account what was being displayed in the data presentation interface when the semantic view is displayed.

In some cases, the data items may be virtualized, and therefore only loaded into memory when needed. For instance, if the collection has millions of items, only the small portion the user is currently browsing need to be virtualized. Thus, at least in cases where virtualization is used, data mappings 133 may be provided only for those data items that are virtualized or loaded into memory. If a third user input 108 is received that selects a data item presented in the semantic interface, that data item selected by the user is dynamically loaded into memory and displayed (or is represented by) a semantic header 131. Those data items indicated as being part of the selected group of data items 132 are displayed in the semantic interface (act 350).

Accordingly, methods, systems and computer program products are provided which allow semantic navigation of a data collection. Moreover, methods, systems and computer program products are provided which provide custom data mappings for a semantic group of data items, allowing each application to have its own set of semantic headers to assist in navigation of the application's data items.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A computer-implemented method for controlling an interface to permit replacement of a data presentation interface with a semantic interface in order to facilitate semantically navigating a data collection, the computer-implemented method being performed by one or more processors of a mobile computing device when executing computer-executable instructions, and comprising the following acts:

for an application interface, providing (i) a data presentation interface that is a default interface for an associated software application, the data presentation interface presenting individual data items as laid out by the default interface of the associated software application, and (ii) a plurality of semantic interfaces that use a plurality of semantic headers to represent higher level semantic groupings of the individual data items;

displaying, at a multi-touch display of the mobile computing device, the data presentation interface with a plurality of the individual data items of the data collection;

identifying from a user input that the individual data items from the data presentation interface are mapped to the plurality of semantic headers for flail grouping of the individual data items in the plurality of semantic interfaces;

receiving, at the multi-touch display of the mobile computing device, a first multi-touch gesture that is configured to switch from the data presentation interface to the plurality of semantic interfaces;

in response to receiving the first multi-touch gesture, determining the individual data items that were being displayed at the data presentation interface when the second user input was received, and switching from the data presentation interface to the plurality of semantic interfaces;

displaying, at the multi-touch display of the mobile computing device, a first of the plurality of semantic interfaces, which includes the plurality of semantic headers grouping the individual data items that were being displayed at the data presentation interface when the first multi-touch gesture was received, the individual data items being displayed at a first detail level as defined by the first of the plurality of semantic interfaces;

receiving, at the multi-touch display of the mobile computing device, a second multi-touch gesture that is different from the first multi-touch gesture, and that is configured to zoom among the plurality of semantic interfaces; and in response to receiving the second multi-touch gesture, displaying, at the multi-touch display of the mobile computing device, a second of the plurality of semantic interfaces, which includes the plurality of semantic headers grouping the individual data items that were being displayed at the data presentation interface when the first multi-touch gesture was received, the individual data items being displayed at a second detail level as defined by the second of the plurality of semantic interfaces.

2. The computer-implemented method of claim 1, wherein switching from the data presentation interface to the plurality of semantic interfaces comprises displaying the plurality of semantic interfaces in place of the data presentation interface.

3. The computer-implemented method of claim 1, wherein switching from the data presentation interface to the plurality of semantic interfaces comprises superimposing the plurality of semantic interfaces over the data presentation interface.

4. The computer-implemented method of claim 1, wherein the plurality of semantic interfaces are provided by a semantic navigation extension that is separate from the software application.

5. The computer-implemented method of claim 1, wherein the individual data items are organized hierarchically.

6. The computer-implemented method of claim 1, further comprising:
   receiving selection of at least one of the plurality of semantic headers;
   navigating the data presentation interface to the grouping of individual data items corresponding to the selected at least one of the plurality of semantic headers; and
   receiving a user input that dynamically selects a new criteria on which the individual data items are to be sorted in the plurality of semantic interfaces.

7. A computer program product comprising one or more hardware storage devices having stored thereon computer-executable instructions that, when executed by one or more processors of a mobile computing system, configure the mobile computing system to control an interface to permit replacement of a data presentation interface with a semantic interface in order to facilitate semantically navigating a data collection, including computer-executable instructions that configure the mobile computing system to perform at least the following:
   for an application interface, provide (i) a data presentation interface that is a default interface for an associated software application, the data presentation interface presenting individual data items as laid out by the default interface of the associated software application, and (ii) a plurality of semantic interfaces that use a plurality of semantic headers to represent higher level semantic groupings of the individual data items;
   display, at a multi-touch display of the mobile computing system, the data presentation interface with a plurality of the individual data items of the data collection;
   identify from a user input that the individual data items from the data presentation interface are mapped to the plurality of semantic headers for grouping of the individual data items in the plurality of semantic interfaces;
   receive, at the multi-touch display of the mobile computing system, a first multi-touch gesture that is configured to switch from the data presentation interface to the plurality of semantic interfaces;
   in response to receiving the first multi-touch gesture, determine the individual data items that were being displayed at the data presentation interface when the second user input was received, and
   switch from the data presentation interface to the plurality of semantic interfaces;
   display, at the multi-touch display of the mobile computing system, a first of the plurality of semantic interfaces, which includes the plurality of semantic headers grouping the individual data items that were being displayed at the data presentation interface when the first multi-touch gesture was received, the individual data items being displayed at a first detail level as defined by the first of the plurality of semantic interfaces;
   receive, at the multi-touch display of the mobile computing system, a second multi-touch gesture that is different from the first multi-touch gesture, and that is configured to zoom among the plurality of semantic interfaces; and
   in response to receiving the second multi-touch gesture, display, at the multi-touch display of the mobile computing system, a second of the plurality of semantic interfaces, which includes the plurality of semantic headers grouping the individual data items that were being displayed at the data presentation interface when the first multi-touch gesture was received, the individual data items being displayed at a second detail level as defined by the second of the plurality of semantic interfaces.

8. The computer program product of claim 7, wherein the individual data items are virtualized such that only a portion of a grouping of individual data items is loaded into memory.

9. The computer program product of claim 8, wherein only individual data items from the data presentation interface that are mapped to a header are loaded into memory.

10. A mobile computing system comprising:
   one or more processors;
   a multi-touch display; and
   a memory having stored therein computer-executable instructions that, when executed by the one or more processors, configure the one or more processors to control an interface to permit replacement of a data presentation interface with a semantic interface in order to facilitate semantically navigating a data collection, including computer-executable instructions that configure the one or more processors to perform at least the following:
   for an application interface, provide (i) a data presentation interface that is a default interface for an associated software application, the data presentation interface presenting individual data items as laid out by the default interface of the associated software application, and (ii) a plurality of semantic interfaces that use a plurality of semantic headers to represent higher level semantic groupings of the individual data items;

display, at the multi-touch display of the mobile computing system, the data presentation interface with a plurality of the individual data items of the data collection;

identify from a user input that the individual data items from the data presentation interface are mapped to the plurality of semantic headers for flail grouping of the individual data items in the plurality of semantic interfaces;

receive, at the multi-touch display of the mobile computing system, a first multi-touch gesture that is configured to switch from the data presentation interface to the plurality of semantic interfaces;

in response to receiving the first multi-touch gesture, determine the individual data items that were being displayed at the data presentation interface when the second user input was received, and switch from the data presentation interface to the plurality of semantic interfaces;

display, at the multi-touch display of the mobile computing system, a first of the plurality of semantic interfaces, which includes the plurality of semantic headers grouping the individual data items that were being displayed at the data presentation interface when the first multi-touch gesture was received, the individual data items being displayed at a first detail level as defined by the first of the plurality of semantic interfaces;

receive, at the multi-touch display of the mobile computing system, a second multi-touch gesture that is different from the first multi-touch gesture, and that is configured to zoom among the plurality of semantic interfaces; and in response to receiving the second multi-touch gesture, display, at the multi-touch display of the mobile computing system, a second of the plurality of semantic interfaces, which includes the plurality of semantic headers grouping the individual data items that were being displayed at the data presentation interface when the first multi-touch gesture was received, the individual data items being displayed at a second detail level as defined by the second of the plurality of semantic interfaces.

* * * * *